United States Patent
Coman et al.

(10) Patent No.: US 10,302,801 B2
(45) Date of Patent: May 28, 2019

(54) TEMPERATURE CORRECTION OF MAGNETIC RESONANCE DATA

(71) Applicants: Radu Coman, Hannover (DE); Holger Tietjen, Hannover (DE)

(72) Inventors: Radu Coman, Hannover (DE); Holger Tietjen, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 266 days.

(21) Appl. No.: 15/139,914

(22) Filed: Apr. 27, 2016

(65) Prior Publication Data

US 2017/0315257 A1    Nov. 2, 2017

(51) Int. Cl.
    *G01V 3/32*      (2006.01)

(52) U.S. Cl.
    CPC ...................... *G01V 3/32* (2013.01)

(58) Field of Classification Search
    USPC ............. 324/300–322; 600/407–435; 382/128–131
    See application file for complete search history.

(56) References Cited

U.S. PATENT DOCUMENTS

| | | | |
|---|---|---|---|
| 7,937,999 B2 | 5/2011 | Blanz et al. | |
| 2004/0196038 A1* | 10/2004 | Kruspe | E21B 33/1243 324/303 |
| 2007/0075706 A1* | 4/2007 | Chen | G01V 3/30 324/303 |
| 2008/0073122 A1* | 3/2008 | Blanz | G01K 7/42 175/50 |
| 2011/0077523 A1* | 3/2011 | Angott | A61B 5/0059 600/448 |

(Continued)

FOREIGN PATENT DOCUMENTS

CA     2663579 A1     4/2008

OTHER PUBLICATIONS

Coates, et al., NMR Logging Principles & Applications; Halliburton Energy Services Publication (1999); pp. 1-120.

(Continued)

*Primary Examiner* — Tung X Nguyen
*Assistant Examiner* — Robert P Alejnikov, Jr.
(74) *Attorney, Agent, or Firm* — Cantor Colburn LLP

(57) ABSTRACT

An apparatus for estimating properties of an earth formation includes a nuclear magnetic resonance (NMR) measurement device including a magnet assembly, at least one transmitting assembly configured to generate an oscillating magnetic field in the formation, and a receiver configured to detect NMR signals from at least a sensitive volume in the formation. The apparatus also includes a processing device configured to receive NMR data corresponding to the detected NMR signals. The processing device is configured to perform combining a geometrical factor of the NMR logging tool with a temperature distribution, the temperature distribution indicating a temperature value at at least one location in the sensitive volume of the formation, correcting the NMR data based on the temperature value, estimating a property of the formation based on the corrected NMR data, and performing one or more aspects of an energy industry operation based on the estimated property.

20 Claims, 5 Drawing Sheets

(56) References Cited

U.S. PATENT DOCUMENTS

| | | | |
|---|---|---|---|
| 2011/0298680 A1* | 12/2011 | Shylo | A61B 5/015 343/762 |
| 2015/0317457 A1* | 11/2015 | Mansouri | G01N 33/48792 702/25 |
| 2016/0033670 A1* | 2/2016 | Reiderman | G01V 3/32 324/303 |

OTHER PUBLICATIONS

Coates, et al., NMR Logging Principles & Applications; Halliburton Energy Services Publication (1999); pp. 121-233.
Flaum, et al.; "Geometrical Specticiations of Logging Tools: The Need for New Standards"; SPWLA 32nd Annual Logging Symposium, Jun. 16-19, 1991; 23 pages.

* cited by examiner

TEMPERATURE CORRECTION OF MAGNETIC RESONANCE DATA

BACKGROUND

Nuclear magnetic resonance (NMR) is a technology that is very useful in evaluating characteristics of geologic formations and fluids located therein, and is thus an important tool for hydrocarbon exploration and production. NMR can be used to estimate formation characteristics such as permeability and mineralogy-independent porosity of rocks, to perform fluid typing and determine fluid volumes, and to estimate fluid characteristics such as viscosity.

Raw NMR data is typically processed to derive formation information such as porosity. One such processing technique includes calibration of raw NMR data to transform the raw data to porosity units. Processing NMR data also typically includes correction or calibration of the data, which is based on the temperature of borehole fluid, as the temperature at a volume of interest of the formation is not directly measured. Differences between the temperature of the borehole fluid and the temperature at the volume of interest can result in significant errors in analysis of NMR data.

SUMMARY

An embodiment of an apparatus for estimating properties of an earth formation includes a carrier configured to be deployed in a borehole in the earth formation, and a nuclear magnetic resonance (NMR) measurement device including a magnet assembly configured to generate a static magnetic field in the formation, at least one transmitting assembly configured to generate an oscillating magnetic field in the formation, and a receiver configured to detect NMR signals from at least a sensitive volume in the formation. The apparatus also includes a processing device configured to receive NMR data corresponding to the detected NMR signals. The processing device is configured to perform combining a geometrical factor of the NMR logging tool with a temperature distribution, the temperature distribution indicating a temperature value at at least one location in the sensitive volume of the formation, correcting the NMR data based on the temperature value, estimating a property of the formation based on the corrected NMR data, and performing one or more aspects of an energy industry operation based on the estimated property.

An embodiment of a method of estimating properties of an earth formation includes disposing a nuclear magnetic resonance (NMR) measurement device in a borehole in the earth formation, the NMR measurement device including a magnet assembly configured to generate a static magnetic field in the formation, at least one transmitting assembly configured to generate an oscillating magnetic field in the formation, and a receiver configured to detect NMR signals from at least a sensitive volume in the formation. The method also includes receiving NMR data corresponding to the detected NMR signals by a processing device, combining a geometrical factor of the NMR logging tool with a temperature distribution, the temperature distribution indicating a temperature value at at least one location in the sensitive volume of the formation, correcting the NMR data based on the temperature value, estimating a property of the formation based on the corrected NMR data, and performing one or more aspects of an energy industry operation based on the estimated property.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Methods, systems and apparatuses for measuring characteristics of an earth formation using magnetic resonance techniques are described herein. Embodiments of NMR measurement and processing methods include correcting NMR measurement data based on a temperature distribution of a volume of interest and/or a sensitive volume of a formation, and based on the geometrical response of a NMR measurement device.

The temperature distribution may be a three-dimensional, two-dimensional or one-dimensional distribution. In one embodiment, NMR data is corrected based on a one-dimensional temperature distribution obtained by using various assumptions (e.g., a constant axial temperature and a constant radial temperature gradient) in combination with a radial geometrical factor. In one embodiment, NMR data is corrected based on an estimated temperature that is derived from a temperature value or range of temperature values associated with a location or region of a volume of interest that correspond to the centroid of the radial geometrical factor.

Figure 1:
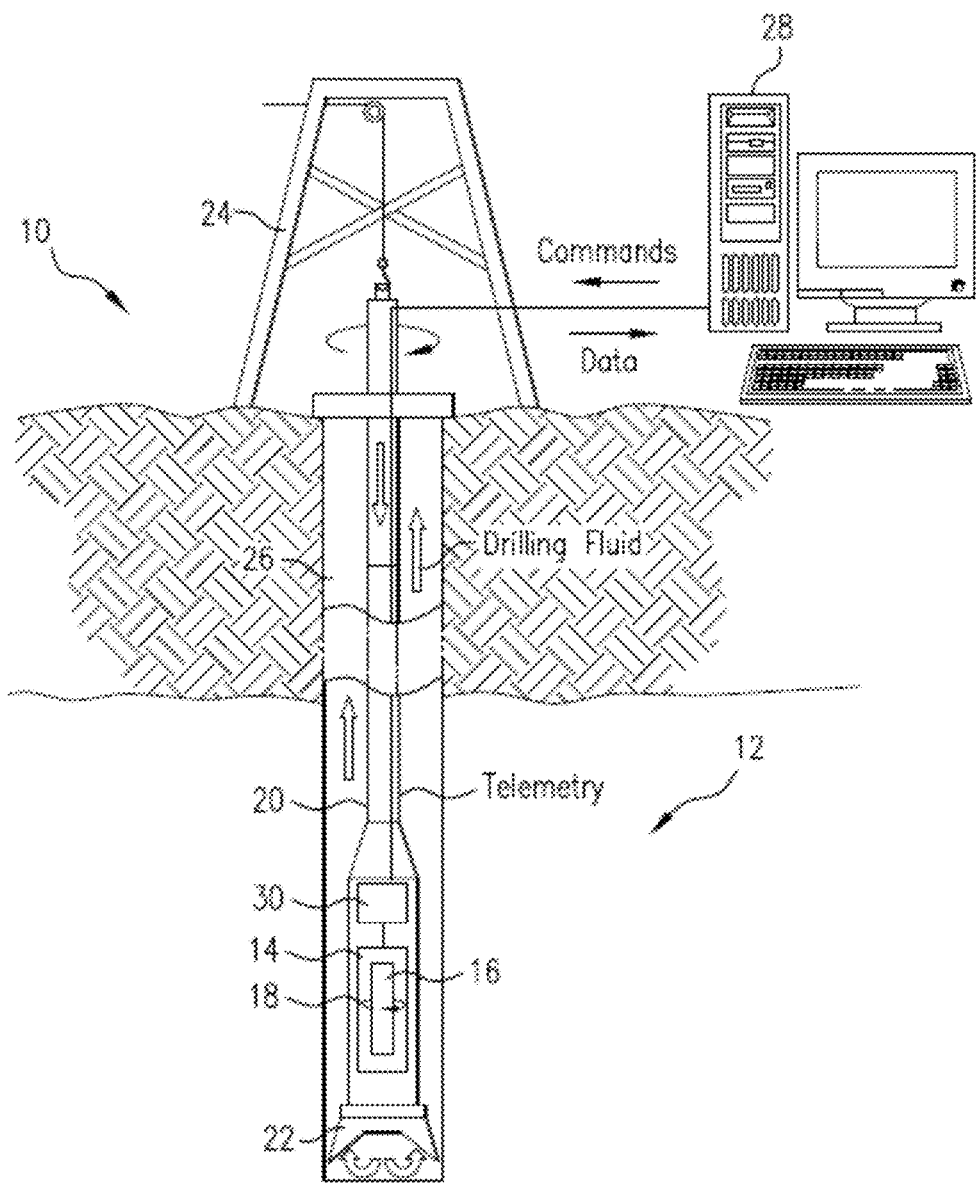
FIG. 1 depicts an embodiment of a formation measurement system that includes a nuclear magnetic resonance (NMR) measurement apparatus.

FIG. 1 illustrates an exemplary embodiment of a downhole measurement, data acquisition, and/or analysis system 10 that includes devices or systems for in-situ measurement of characteristics of an earth formation 12. The system 10 includes a magnetic resonance apparatus such as a NMR tool 14. An example of the magnetic resonance apparatus is a logging-while-drilling (LWD) magnetic resonance tool. The tool 14 is configured to generate magnetic resonance data for use in estimating characteristics of a formation, such as porosity, irreducible water saturation, permeability, hydrocarbon content, and fluid viscosity.

An exemplary tool 14 includes a static magnetic field source 16, such as a permanent magnet assembly, that magnetizes formation materials and a transmitter and/or receiver assembly 18 (e.g., an antenna or antenna assembly) that transmits radio frequency (RF) energy or pulsed energy that provides an oscillating magnetic field in the formation, and detects NMR signals as voltages induced in the receiver. The transmitter assembly 18 may serve the receive function, or distinct receiving antennas may be used for that purpose. It can be appreciated that the tool 14 may include a variety of components and configurations as known in the art of nuclear magnetic resonance or magnetic resonance imaging.

The tool 14 may be configured as a component of various subterranean systems, such as wireline well logging and LWD systems. For example, the tool 14 can be incorporated within a drill string 20 including a drill bit 22 or other suitable carrier and deployed downhole, e.g., from a drilling rig 24 into a borehole 26 during a drilling operation. The tool 14 is not limited to the embodiments described herein, and may be deployed in a carrier with alternative conveyance methods. A "carrier" as described herein means any device, device component, combination of devices, media and/or member that may be used to convey, house, support or otherwise facilitate the use of another device, device component, combination of devices, media, and/or member. Exemplary non-limiting carriers include drill strings of the coiled tube type, of the jointed pipe type, and any combination or portion thereof. Other carrier examples include casing pipes, wirelines, wireline sondes, slickline sondes, drop shots, downhole subs, bottom-hole assemblies, and drill strings.

In one embodiment, the tool 14 and/or other downhole components are equipped with transmission equipment to communicate ultimately to a surface processing unit 28. Such transmission equipment may take any desired form, and different transmission media and methods may be used, such as wired, fiber optic, and/or wireless transmission methods. Additional processing units may be deployed with the carrier. For example, a downhole electronics unit 30 includes various electronic components to facilitate receiving signals and collect data, transmitting data and commands, and/or processing data downhole. The surface processing unit 28, downhole electronics 30, the tool 14, and/or other components of the system 10 include devices as necessary to provide for storing and/or processing data collected from the tool 14 and other components of the system 10. Exemplary devices include, without limitation, at least one processor, storage, memory, input devices, output devices, and the like.

Figure 2:
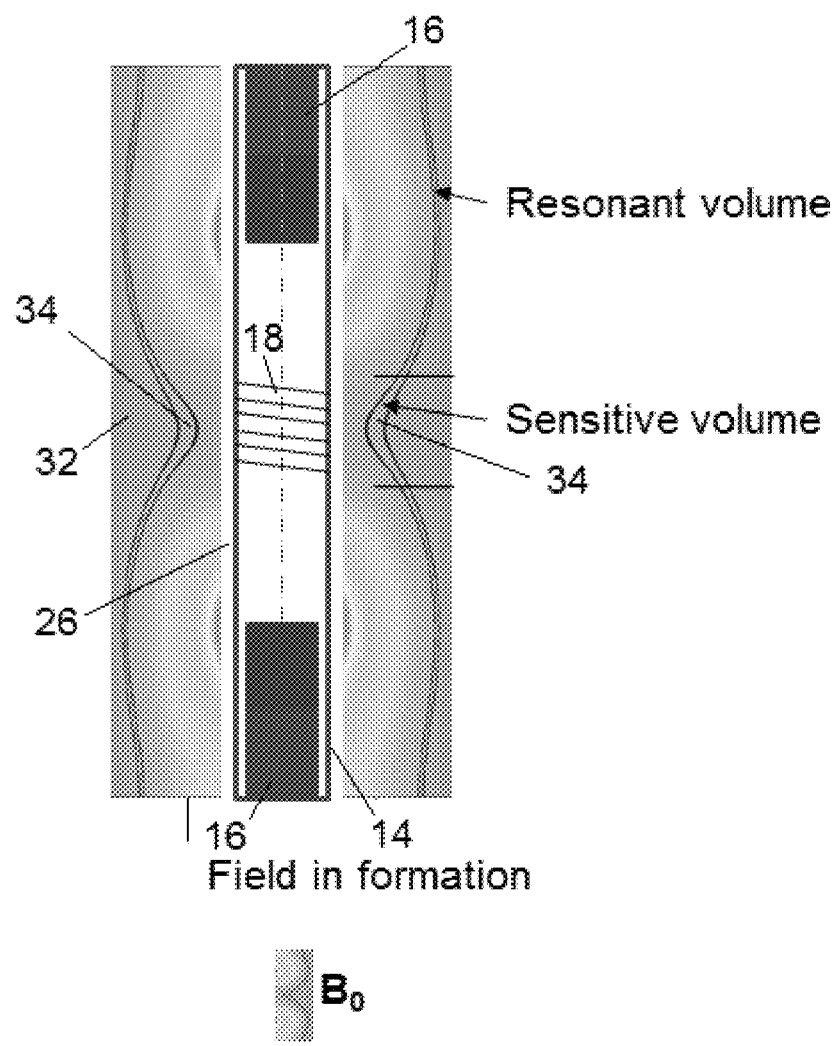
FIG. 2 depicts an example of the NMR measurement apparatus and illustrates aspects of an NMR measurement.

FIG. 2 shows an example of the tool 14 and illustrates aspects of operation of the tool. This example is provided for illustrative purposes and is not intended to be limiting.

Magnetic resonance measurements are performed by the NMR tool 14, which generates a static magnetic field ($B_0$) in a volume of a formation 32 (a volume of interest) using one or more magnets (e.g., two magnetic field sources 16). An oscillating (e.g., RF) magnetic field ($B_1$), which is at least substantially perpendicular to the static magnetic field, is generated in the volume of interest. The volume of interest may be circular or toroidal around the borehole, and/or focused or directed toward a specific angular region (i.e., side-looking).

The surface processing unit 28, downhole electronics 30 and/or other suitable processing device includes a processor configured to generate electrical pulses and transmit the pulses to the transmitter assembly, which in turn generates pulses of electromagnetic energy that induce the oscillating field $B_1$ in the volume of interest. Such a processing device may be referred generally as a pulse generator, which includes a microcontroller or other processor that is capable of transmitting a pulse sequence. The pulse sequence can be programmed or set based on parameters such as pulse duration, time intervals between pulses and time between successive pulse sequences (wait time). The processing device may be disposed at a surface location (e.g., in some wireline operations) or may be disposed downhole (e.g., in some LWD operations).

When exposed to the magnetic field $B_0$, the spin axes of hydrogen nuclei in the formation precess around the direction of the $B_0$ field with the Larmor frequency, which is proportional to the strength of the magnetic field $B_0$. The direction of orientation of the field $B_0$ in the formation volume of interest is referred to as the longitudinal direction.

The magnetic fields define a sensitive volume 34 in the formation. The sensitive volume, in one embodiment, is defined as a volume from which most of the recorded NMR signal originates. The sensitive volume is typically determined by the magnetic field intensity, the field gradient and the effective bandwidth of the pulse(s).

Over time, the spin axes align themselves at distinct angles along the $B_0$ field and create a net magnetization (i.e., polarization), which will build up with the time constant $T_1$. $T_2$ is a time constant known as the transversal relaxation. It describes the loss of magnetization in the plane orthogonal to the $B_0$ field.

The $B_1$ field is typically applied as a series of short duration pulses, which may be rectangular or other shaped pulses. In an embodiment of a pulse sequence, the first pulse is a "tipping pulse", which acts to align the nuclear magnetization in the formation in a direction perpendicular to the static field $B_0$. After the tipping pulse, the nuclear magnetic moment of the nuclei gradually return or "relax" to their alignment with the static field.

At selected times after the tipping pulse, "refocusing pulses" are applied, which have durations and amplitudes selected to at least partly reverse the magnetizations of microscopic volume elements. In consequence the coherent macroscopic magnetization that was lost after the tipping pulse rephases now after each refocusing pulse, resulting in a so-called spin echo train.

Raw NMR logging data in the form of NMR echo train data is received and processed so that the data provides an indication of formation properties. For example, NMR data is calibrated to transform data values to porosity units. This calibration requires temperature data, which is typically derived from measurements of temperature of fluid (e.g., drilling mud, injection fluid and/or produced fluid) in the borehole. However, this approach is deficient as the temperature in the sensitive volume may not correspond to the temperature of borehole fluid or the temperature in the borehole.

The NMR logging signal is direct proportional to the macroscopic magnetization of the hydrogen atoms located in the pores of the formation proximal to the NMR sensor. The macroscopic magnetization $M_0$ is defined as the net magnetic moment per unit volume. For the case of N nuclei per unit volume, the magnetization is given by Curie's Law as:

$$M_0 = N \frac{\gamma^2 h^2 I(I+1)}{3(4\pi^2)kT} B_0, \qquad (1)$$

where, k is the Boltzman's constant, T is the absolute temperature (Kelvin), h is the Planck's constant, and I is the spin quantum number of the nucleus.

NMR measurements and analysis of NMR data (echo trains) may include calibrating raw NMR data so that the NMR data reflects values of porosity of the sensitive volume. For example, measured NMR signals are calibrated relative to the porosity at a calibration probe. Typically, the NMR signals are calibrated to porosity units (p.u.) (usually, the porosity of the probe is 100 p.u.). The temperature typically used to perform this calibration step is the temperature of the probe (denoted as $T_C$).

Calibration is typically performed by calculating a calibration constant C to transform the arbitrary units of the raw NMR logging signal into porosity units. For example, if C is the determined calibration constant and S is the NMR signal measured in the borehole, the calibrated NMR porosity, $\varphi_C$, which is based on the probe temperature $T_C$, reads as follows:

$$\varphi_C = S \cdot C \tag{2}$$

As discussed above, the calibration factor C does not consider the effect of the temperature in the sensitive volume on the measured signal, but rather assumes that the temperature of the sensitive volume is the same as the temperature of the calibration probe.

Performing temperature calibration of NMR data using the probe temperature (or other measurement of temperature of the borehole and/or borehole fluid) can lead to inaccurate calibration results. For example, in wireline NMR, mud or borehole fluid is typically in contact with the formation over many hours and even days, thus the temperature of the mud and the temperature of the sensitive volume might be close to each other. However, in logging-while-drilling (LWD) NMR, the contact time between borehole fluid and the formation is significantly shorter, thus the temperature of the borehole fluid may not be an accurate proxy for formation temperature. If the two temperatures are not equal, a so-called temperature effect deteriorates the accuracy of estimated NMR porosities. In some instances, this effect can be quite large, as temperature differences of up to 30 K or more have been observed.

This deficiency is addressed by embodiments described herein, which utilize a temperature correction based on an estimation of temperature that incorporates an estimate of the temperature distribution in at least a part of the sensitive volume in combination with an estimate of the geometrical response of an NMR measurement device or tool. Weighting the temperature distribution with the geometrical response factor provides a more accurate temperature correction.

A processing unit or processor, such as the surface processing unit 28, electronics 30 and/or other suitable processing device, receives raw NMR data and performs a temperature correction and/or calibration method that incorporates a temperature distribution in at least a part of the sensitive volume, and a geometrical response of the tool. In one embodiment, the geometrical response is a radial geometric factor.

Several methods are described herein by which the processing unit can apply the temperature correction. The most general approach includes using a three-dimensional geometrical factor and a three-dimensional temperature distribution in the sensitive volume. In one embodiment, by further assumptions, the requirements for the geometrical factor and for the temperature distribution can be reduced to two dimensions or one dimension. The temperature distribution may be analyzed to generate a single representative temperature. For example, a representative temperature is calculated as a value of the temperature (from the temperature distribution) at the centroid of the radial geometrical factor.

The radial geometrical response of a logging tool can be expressed as a radial geometric factor. The radial geometric factor is dependent on a number of considerations, including tool specifications (e.g., geometry, source type, source and detector positions, etc.), borehole properties and/or formation properties, particularly those within the depth of investigation of the tool. Borehole properties include geometric properties such as radius and orientation (e.g., inclination and azimuth), casing dimensions and properties, cement properties, fluid composition, mud cake thickness and others. Formation properties include lithology, fracture properties, fluid content and others. This information is useful in describing the relative contribution of each volume element (e.g., borehole fluid, casing, mudcake and/or formation volume elements) at varying radial distances from the center of the borehole and/or from the tool.

The geometrical factor is derived based on the assumption that the total detected signal is a weighted linear sum or convolution of signals from individual volume elements or cells, which may be one-dimensional, two dimensional or three-dimensional. A raw NMR signal thus includes individual signal contributions ($s_i$) from each cell i of a number n of cells. A geometrical factor can be expressed as:

$$g_i = s_i/S, \tag{3}$$

which can vary between cells at different distances from the tool.

The response of an NMR measurement device (also referred to herein as a NMR tool) can be described based on an infinitely small cell bounded by the parameters dx, dy and dz for Cartesian coordinates, or by dr, d$\theta$ and dz for polar coordinates. A signal $s(r,\theta,z)$ is associated with each cell, which is proportional to the NMR porosity at the cell location. A geometrical factor $g(r,\theta,z)$ defines the contribution of the signal at the cell location relative to the total signal. The total signal can thus be defined as:

$$S = \iiint s(x,y,z) g(x,y,z) dx dy dz, \tag{4}$$

for Cartesian coordinates, and can be defined as:

$$S = \iiint s(r,\theta,z) g(r,\theta,z) dr d\theta dz, \tag{5}$$

for polar coordinates.

If it is assumed that the sensitive volume of the formation is symmetrical around the borehole (i.e., cylindrically symmetric), a radial geometrical factor can be derived. The radial geometrical factor depends only on the radial distance r from the center of the tool and/or borehole. The radial geometrical factor G can be defined as:

$$G(r) = \iint g(r,\theta,z) d\theta dz. \tag{6}$$

The geometrical factor and the radial geometric factor can be obtained via, for example, a numerical simulation, an analytical solution, laboratory measurements, user input or any other suitable technique or source.

The radial geometric factor can be integrated to obtain the percentage of the signal S that is received from a volume inside a radius r. This integrated radial geometrical factor is defined as:

$$\Gamma(r) = \int G(r) dr. \tag{7}$$

Based on the temperature distribution and the geometrical factor, an estimate for the temperature at the sensitive volume is performed. The temperature estimate can be generated based on a three-dimensional temperature distribution and geometrical factor (the three-dimensional approach), a two-dimensional temperature distribution and geometrical factor (the two-dimensional approach), or a one-dimensional temperature distribution and geometrical factor (the one-dimensional approach).

The three-dimensional approach considers the detailed distribution of the temperature profile, T(x,y,z) or T(r,$\theta$,z), in the sensitive volume. The three-dimensional temperature distribution can be obtained from numerical simulations, analytical computations, or a user defined distribution.

In this approach, a temperature calibrated NMR signal $\varphi_M$, representing a temperature calibrated NMR porosity (in porosity units) is defined as:

$$\varphi_M = \frac{C \cdot T_M}{T_C} \int\int\int s(x, y, z)g(x, y, z)dxdydz, \quad (8)$$

where $T_M$ is the temperature of the mud or other borehole fluid, $T_C$ is the temperature measured by a calibration probe, and C is a calibration constant.

By using the raw NMR signal, S, equation (8) reads:

$$\varphi_M = \frac{C \cdot T_M \cdot S}{T_C}. \quad (9)$$

By assuming a homogeneous distribution of the NMR porosity in the sensitive volume, the three-dimensional temperature corrected NMR porosity $\varphi_{MT}$, which is corrected based on a three-dimensional temperature distribution and geometrical factor, reads as follow:

$$\varphi_{MT} = \frac{\varphi_M}{T_M} \int\int\int T(x, y, z)g(x, y, z)dxdydz. \quad (10)$$

By using the cylindrical coordinates (because of the cylindrical symmetry of the borehole and of the tool), equation (10) reads as follows:

$$\varphi_{MT} = \frac{\varphi_M}{T_M} \int\int\int T(r, \theta, z)g(r, \theta, z)drd\theta dz. \quad (11)$$

Equations (10) and (11) are the mathematical basis for implementation of the three-dimensional temperature correction.

Other potentially simpler and less time consuming approaches may be utilized for the temperature correction of NMR data. In one embodiment, by further assuming axial (z-axis) symmetry for the temperature distribution and for the geometrical factor, equation (11) can be represented as follows:

$$\varphi_{MT} = \frac{\varphi_M}{T_M} \int\int T(r, z)g(r, z)drdz, \quad (12)$$

where equation (12) is the mathematical basis for implementation of a two-dimensional temperature correction.

By further assuming that the temperature in the sensitive volume is constant in the axial direction, equation (12) can be represented as:

$$\varphi_{MT} = \frac{\varphi_M}{T_M} \int\int T(r)g(r, z)drdz. \quad (13)$$

Equation (13) may be used to correct for temperature in one dimension, namely the radial dimension, as is referred to as a one-dimensional temperature correction. In the one-dimensional approach, the radial geometrical factor is inserted into equation (13). The radial geometric factor can be represented by:

$$G(r)=\int\int g(r,\theta,z)d\theta dz. \quad (14)$$

Inserting the radial geometric factor into equation (13) results in the following equation:

$$\varphi_{MT} = \frac{\varphi_M}{T_M} \int T(r)G(r)dr. \quad (15)$$

Equation (15) is the mathematical basis for implementation of the one-dimensional temperature correction.

In one embodiment, the one-dimensional temperature correction is performed by assuming that the temperature in the sensitive volume has a constant gradient in the radial direction. In this embodiment, the temperature distribution $T(r)$ can be expressed as:

$$T(r) = T(0) + \frac{dT}{dr}r. \quad (16)$$

Equation (15) can be re-written as:

$$\varphi_{MT} = \frac{\varphi_M \cdot T(r_c)}{T_M}, \quad (17)$$

In equation (17), $r_c$ is radial location of the centroid of the geometric factor and has a value represented by:

$$r_c = \int G(r)rdr. \quad (18)$$

The centroid, or geometric center, of a plane figure or region is the arithmetic mean ("average") position of all the points in the region. The centroid can be defined for any object in n-dimensional space, where the centroid of the object is the mean position of all the points in all of the coordinate directions of the object.

Eq. (17) is the mathematical basis for an embodiment of an implementation of the one-dimensional temperature correction, which assumes a constant temperature gradient in the radial direction. The temperature correction which is based on this implementation is very fast and sufficiently accurate.

Figure 3:
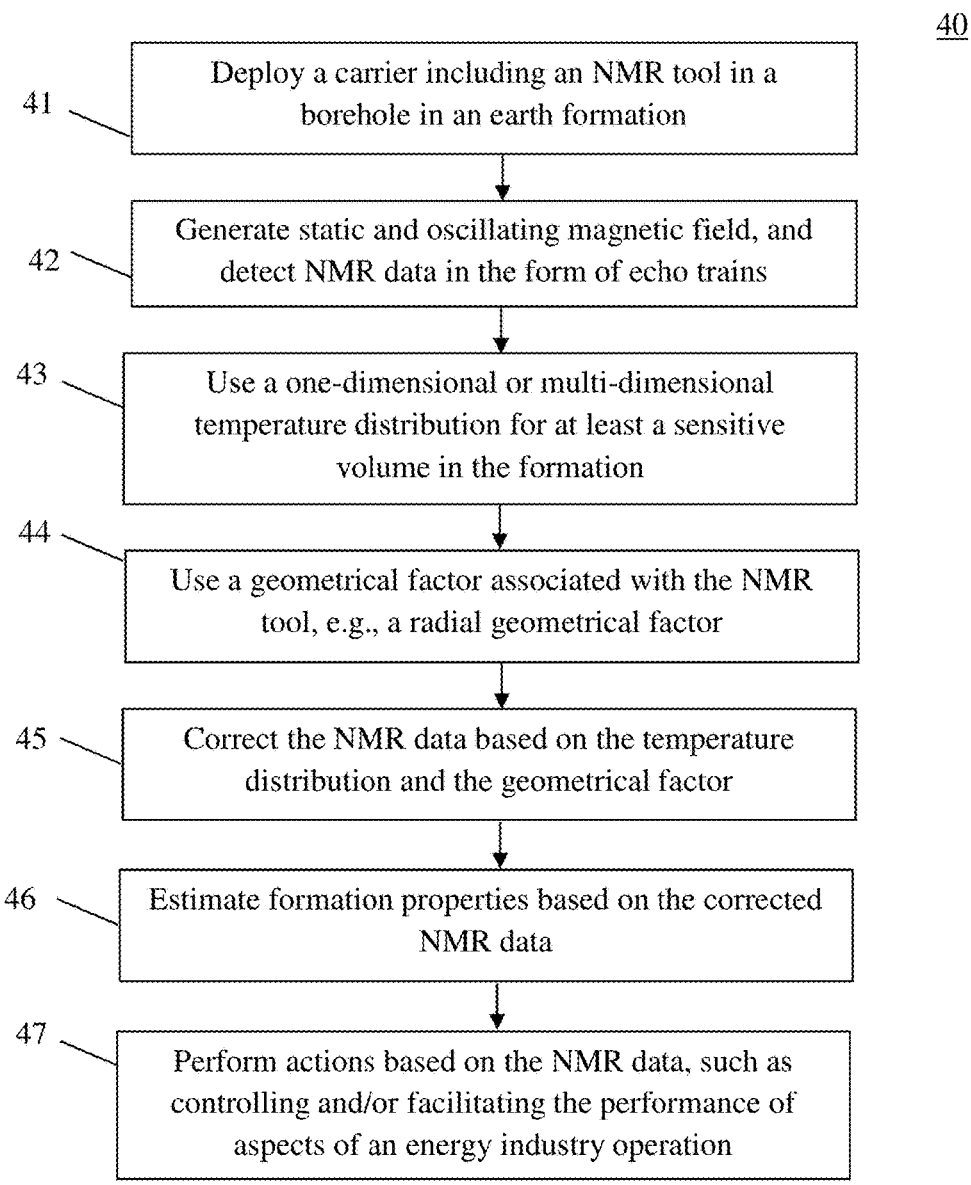
FIG. 3 is a flow chart that depicts an embodiment of a NMR measurement method that includes correcting NMR data based on a temperature distributions and a geometric factor of a NMR measurement device.

FIG. 3 illustrates a method 40 for performing an NMR measurement operation that includes acquiring NMR data and correcting the NMR data based on a temperature distribution in a volume of interest and a geometrical response of an NMR measurement device. The method 40 may be performed in conjunction with the system 10, but is not limited thereto. The method 40 includes one or more of stages 41-47 described herein, at least portions of which may be performed by a processor (e.g., the surface processing unit 28). In one embodiment, the method 40 includes the execution of all of stages 41-47 in the order described. However, certain stages 41-47 may be omitted, stages may be added, or the order of the stages changed.

In the first stage 41, an NMR or other magnetic resonance measurement tool is deployed into a borehole. In one embodiment, the tool (e.g., the tool 14) is deployed as part of a wireline operation, or during drilling as part of a LWD operation.

In the second stage 42, a static magnetic field $B_0$ is generated in a volume of interest in the formation, and a pulsed signal is transmitted from at least one transmitting antenna, which in turn generates an oscillating magnetic field $B_1$ in the volume of interest. At least one receiving antenna detects NMR signals from the volume in and generates raw NMR data. The raw NMR data includes spin echo trains that may be measured at a plurality of depths.

In the third stage 43, a temperature distribution is used. The temperature distribution may be obtained by performing temperature measurements in the borehole or in another borehole in the formation, and calculating the temperature distribution based on formation properties such as lithology and fluid content, and borehole properties such as borehole geometry. The temperature distribution may be estimated by using an analytical formula or a numerical simulation.

Figure 4:
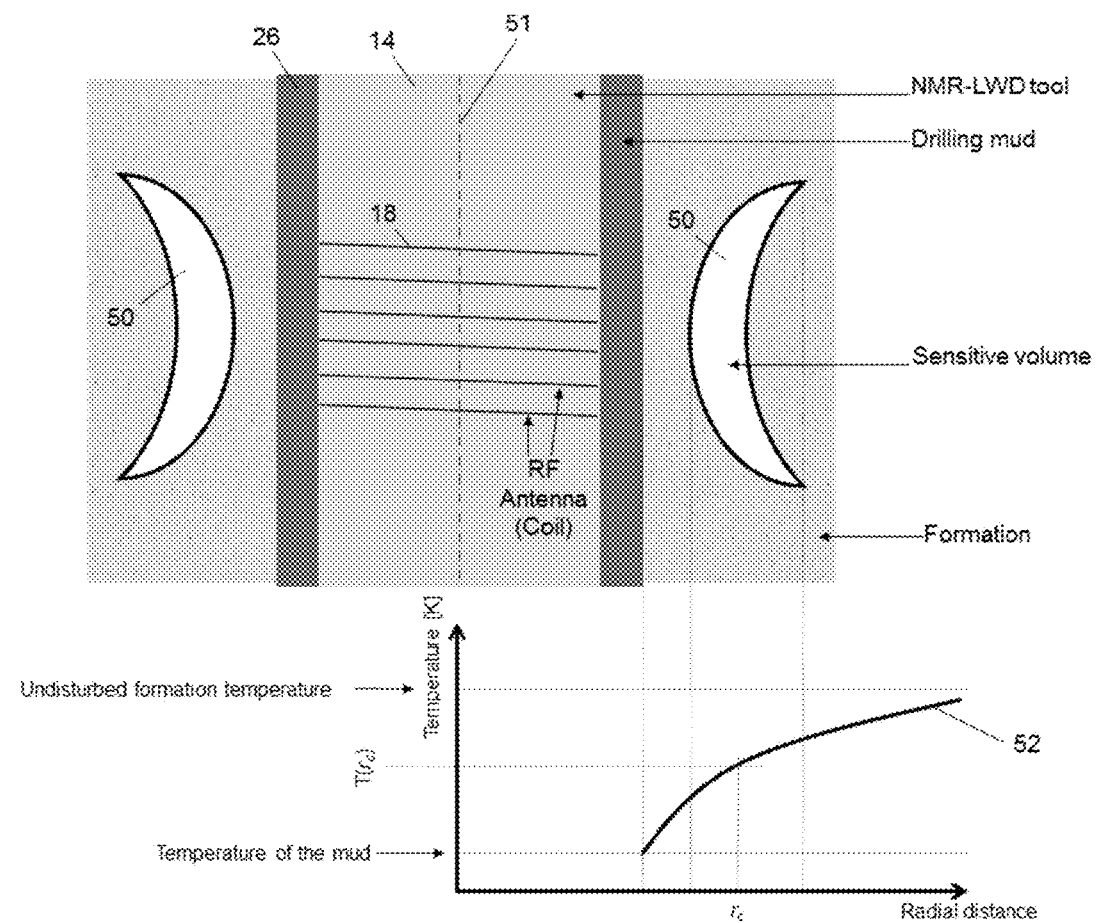
FIG. 4 depicts an example of a temperature distribution used to correct NMR data.

The temperature distribution may be a one-dimensional radial distribution, or a multi-dimensional distribution as discussed above. An example of a temperature distribution is shown in FIG. 4, which illustrates an example of a portion of the NMR tool 14. Operation of the NMR tool results in NMR data being acquired from a sensitive volume 50 of a formation, which forms a cylindrical or toroidal shape centered around the longitudinal axis 51 of the tool 14. An example of a temperature distribution 52 is shown, which presents an estimated or modeled temperature of the formation as a function of radial distance from the borehole.

In the fourth stage 44, a geometrical factor associated with the NMR tool is used. The geometrical factor may be a three-dimensional, two-dimensional or one-dimensional factor. In one embodiment, the geometrical factor is a radial geometrical factor that forms a curve representing geometrical factor values as a function of radial distance from the NMR tool.

Figure 5:
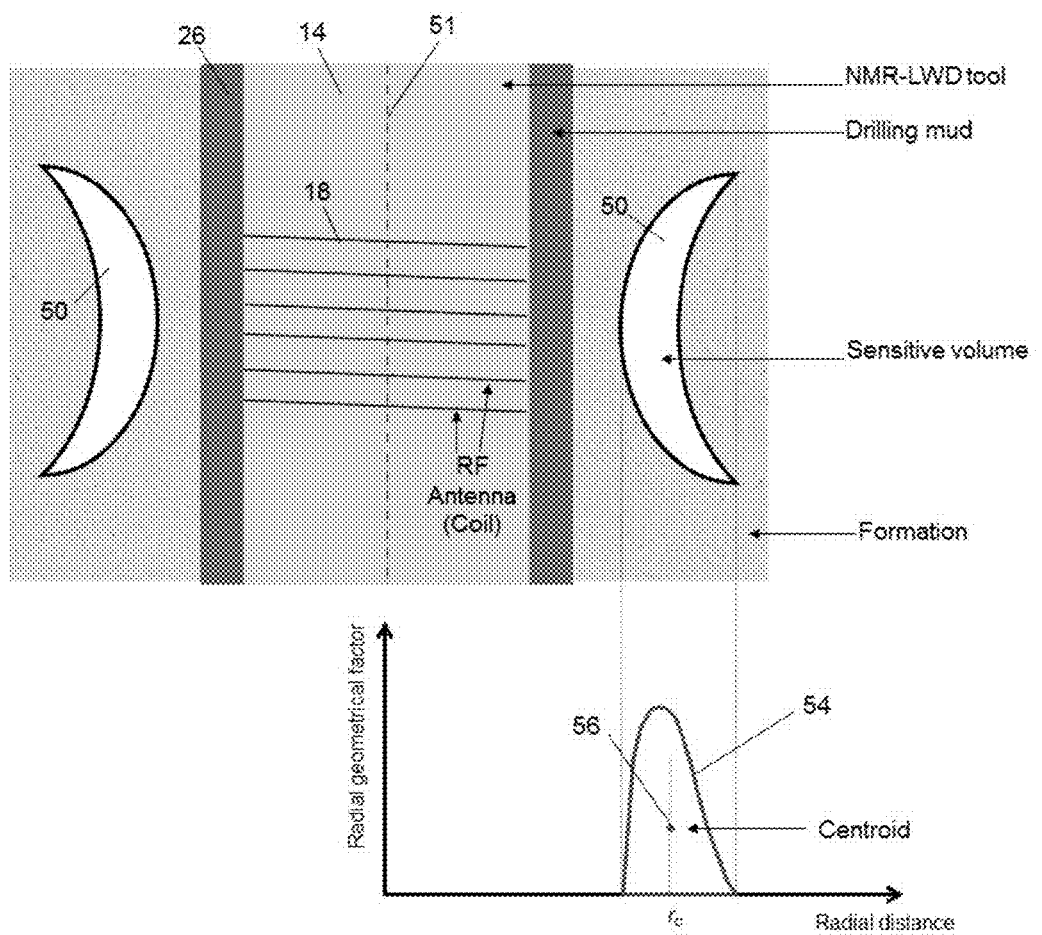
FIG. 5 depicts an example of a geometrical factor used to correct NMR data.

An example of a radial geometrical factor for the NMR tool 14 is shown in FIG. 5. In this example, a radial geometrical factor 54 is used and/or estimated for the tool 14. The geometrical factor may be estimated in any suitable manner as discussed above.

In the fifth stage 45, the raw NMR data is calibrated to transform the raw data into data values that correspond to or provide an indication of one or more formation properties, such as porosity, permeability and/or fluid type. In one embodiment, raw NMR data values are corrected by applying a temperature correction using the temperature distribution and geometrical factor. In one embodiment, correction includes analyzing a radial geometrical factor to determine the centroid of the area formed by the radial geometrical factor curve. The radial location of the centroid is found, and the corresponding radial location is applied to the temperature distribution to determine an estimate of the temperature at the radial location, which is used as the temperature for the correction.

For example, the radial geometrical factor 54 of FIG. 5 is analyzed to determine the centroid 56 of the area defined by the radial geometrical factor 54. The radial location $r_c$ of the centroid 56 is determined, and the temperature at location $r_c$ of the temperature distribution 52 (see FIG. 4) is found. This temperature is used, for example, as T(rc) in equation (17) to calculate a temperature corrected NMR porosity $\varphi_{MT}$.

In the sixth stage 46, properties of the formation are estimated based on the temperature corrected NMR data. For example, the corrected NMR data is analyzed to estimate the porosity of the volume of interest and estimate properties of fluid in the formation. Porosity information may be derived by analyzing the amplitudes of the corrected porosity data and/or by estimating $T_2$ and/or $T_1$ values. For example, a fit of an exponential function to the NMR data is employed to estimate $T_2$ or porosity.

In the seventh stage 47, various actions may be performed using the porosity and/or other formation property derived from NMR measurements. Information described above may be used to perform various actions, such as controlling and/or facilitating the performance of aspects of an energy industry operation. Examples of an energy industry operation include drilling, stimulation, formation evaluation, measurement and/or production operations. For example, the porosity and/or fluid property information is used to plan a drilling operation (e.g., trajectory, bit and equipment type, mud composition, rate of penetration, etc.) and may also be used to monitor the operation in real time and adjust operational parameters (e.g., bit rotational speed, fluid flow). In another example, the information is used to plan, monitor and/or control a production operation, e.g., by planning or adjusting operational parameters such as fluid injection parameters and injection locations. Another example of such an action is the evaluation of production performance (e.g., the amount and type of hydrocarbons being produced and/or production rates), which can be used to make determinations regarding the sufficiency of production and/or regarding modifications to production parameters.

Embodiment 1

An apparatus for estimating properties of an earth formation, the apparatus comprising: a carrier configured to be deployed in a borehole in the earth formation; a nuclear magnetic resonance (NMR) measurement device including a magnet assembly configured to generate a static magnetic field in the formation, at least one transmitting assembly configured to generate an oscillating magnetic field in the formation, and a receiver configured to detect NMR signals from at least a sensitive volume in the formation; and a processing device configured to receive NMR data corresponding to the detected NMR signals, the processing device configured to perform: combining a geometrical factor of the NMR logging tool with a temperature distribution, the temperature distribution indicating a temperature value at at least one location in the sensitive volume of the formation; correcting the NMR data based on the temperature value, and estimating a property of the formation based on the corrected NMR data; and performing one or more aspects of an energy industry operation based on the estimated property.

Embodiment 2

The apparatus of any prior embodiment, wherein the geometrical factor is a three-dimensional or two-dimensional geometrical factor.

Embodiment 3

The apparatus of any prior embodiment, wherein the geometrical factor is a radial geometrical factor.

Embodiment 4

The apparatus of any prior embodiment, wherein the temperature distribution is a three-dimensional or a two-dimensional distribution.

Embodiment 5

The apparatus of any prior embodiment, wherein the temperature distribution is a one-dimensional distribution.

Embodiment 6

The apparatus of any prior embodiment, wherein combining includes multiplying the temperature distribution by the geometrical factor.

Embodiment 7

The apparatus of any prior embodiment, wherein combining includes calculating an integrated radial geometrical factor.

Embodiment 8

The apparatus of any prior embodiment, wherein correcting includes multiplying the NMR data by a correction value derived from the temperature value to estimate a porosity value at one or more locations in the sensitive volume.

Embodiment 9

The apparatus of any prior embodiment, wherein correcting the NMR data includes calculating a centroid of an area or volume defined by the geometrical factor, the temperature value corresponding to a value of the temperature distribution at a location in the sensitive volume corresponding to the centroid.

Embodiment 10

The apparatus of any prior embodiment, wherein correcting includes estimating a temperature corrected porosity $\varphi_{MT}$ based on the following equation:

$$\varphi_{MT} = \frac{\varphi_M \cdot T(r_c)}{T_M},$$

wherein $\varphi M$ is a porosity value estimated by calibrating the NMR data based on a measured temperature of borehole fluid, TM is the measured temperature, and T(rc) is a value of the radial temperature distribution at a radial location rc that corresponds to a centroid of the radial geometrical factor.

Embodiment 11

A method of estimating properties of an earth formation, the method comprising: disposing a nuclear magnetic resonance (NMR) measurement device in a borehole in the earth formation, the NMR measurement device including a magnet assembly configured to generate a static magnetic field in the formation, at least one transmitting assembly configured to generate an oscillating magnetic field in the formation, and a receiver configured to detect NMR signals from at least a sensitive volume in the formation; receiving NMR data corresponding to the detected NMR signals by a processing device; combining a geometrical factor of the NMR logging tool with a temperature distribution, the temperature distribution indicating a temperature value at at least one location in the sensitive volume of the formation; correcting the NMR data based on the temperature value, and estimating a property of the formation based on the corrected NMR data; and performing one or more aspects of an energy industry operation based on the estimated property.

Embodiment 12

The method of any prior embodiment, wherein the geometrical factor is a three-dimensional or two-dimensional geometrical factor.

Embodiment 13

The method of any prior embodiment, wherein the geometrical factor is a radial geometrical factor.

Embodiment 14

The method of any prior embodiment, wherein the temperature distribution is a three-dimensional or a two-dimensional distribution.

Embodiment 15

The method of any prior embodiment, wherein the temperature distribution is a one-dimensional distribution.

Embodiment 16

The method of any prior embodiment, wherein combining includes multiplying the temperature distribution by the geometrical factor.

Embodiment 17

The method of any prior embodiment, wherein combining includes calculating an integrated radial geometrical factor.

Embodiment 18

The method of any prior embodiment, wherein correcting includes multiplying the NMR data by a correction value derived from the estimated temperature value to estimate a porosity value at one or more locations in the sensitive volume.

Embodiment 19

The method of any prior embodiment, wherein correcting the NMR data includes calculating a centroid of an area or volume defined by the geometrical factor, the temperature value corresponding to a value of the temperature distribution at a location in the sensitive volume corresponding to the centroid.

Embodiment 20

The method of any prior embodiment, wherein correcting includes estimating a temperature corrected porosity $\varphi MT$ based on the following equation:

$$\varphi_{MT} = \frac{\varphi_M \cdot T(r_c)}{T_M},$$

wherein $\varphi M$ is a porosity value estimated by calibrating the NMR data based on a measured temperature of borehole fluid, TM is the measured temperature, and T(rc) is a value of the radial temperature distribution at a radial location rc that corresponds to a centroid of the radial geometrical factor.

In connection with the teachings herein, various analyses and/or analytical components may be used, including digital and/or analog subsystems. The system may have components such as a processor, storage media, memory, input, output, communications link (wired, wireless, pulsed mud, optical or other), user interfaces, software programs, signal processors and other such components (such as resistors, capacitors, inductors, etc.) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user, or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. An apparatus for estimating properties of an earth formation, the apparatus comprising:
    a carrier configured to be deployed in a borehole in the earth formation;
    a nuclear magnetic resonance (NMR) measurement device including a magnet assembly configured to generate a static magnetic field in the formation, at least one transmitting assembly configured to generate an oscillating magnetic field in the formation, and a receiver configured to detect NMR signals from at least a sensitive volume in the formation; and
    a processing device configured to receive NMR data corresponding to the detected NMR signals, the processing device configured to perform:
    combining a distribution of signal contribution of the NMR logging tool with a temperature distribution, the temperature distribution indicating a temperature value at at least one location in the sensitive volume of the formation;
    correcting the NMR data based on the temperature value, and estimating a property of the formation based on the corrected NMR data; and
    performing one or more aspects of an energy industry operation based on the estimated property.

2. The apparatus of claim 1, wherein the distribution of signal contribution is a three-dimensional or two-dimensional distribution of signal contribution.

3. The apparatus of claim 1, wherein the distribution of signal contribution is a radial distribution of signal contribution.

4. The apparatus of claim 1, wherein the temperature distribution is a three-dimensional or a two-dimensional distribution.

5. The apparatus of claim 1, wherein the temperature distribution is a one-dimensional distribution.

6. The apparatus of claim 1, wherein combining includes multiplying the temperature distribution by the distribution of signal contribution.

7. The apparatus of claim 1, wherein combining includes calculating an integrated radial distribution of signal contribution.

8. The apparatus of claim 1, wherein correcting includes multiplying the NMR data by a correction value derived from the temperature value to estimate a porosity value at one or more locations in the sensitive volume.

9. The apparatus of claim 1, wherein correcting the NMR data includes calculating a centroid of an area or volume defined by the distribution of signal contribution, the temperature value corresponding to a value of the temperature distribution at a location in the sensitive volume corresponding to the centroid.

10. The apparatus of claim 9, wherein correcting includes estimating a temperature corrected porosity $\varphi_{MT}$ based on the following equation:

$$\varphi_{MT} = \frac{\varphi_M \cdot T(r_c)}{T_M},,$$

wherein $\varphi_M$ is a porosity value estimated by calibrating the NMR data based on a measured temperature of borehole fluid, $T_M$ is the measured temperature, and $T(r_c)$ is a value of the temperature distribution at a radial location $r_c$ that corresponds to the centroid of the distribution of signal contribution.

11. A method of estimating properties of an earth formation, the method comprising:
    disposing a nuclear magnetic resonance (NMR) measurement device in a borehole in the earth formation, the NMR measurement device including a magnet assembly configured to generate a static magnetic field in the formation, at least one transmitting assembly configured to generate an oscillating magnetic field in the formation, and a receiver configured to detect NMR signals from at least a sensitive volume in the formation;
    receiving NMR data corresponding to the detected NMR signals by a processing device;
    combining a distribution of signal contribution of the NMR logging tool with a temperature distribution, the temperature distribution indicating a temperature value at at least one location in the sensitive volume of the formation;
    correcting the NMR data based on the temperature value, and estimating a property of the formation based on the corrected NMR data; and
    performing one or more aspects of an energy industry operation based on the estimated property.

12. The method of claim 11, wherein the distribution of signal contribution is a three-dimensional or two-dimensional distribution of signal contribution.

13. The method of claim 11, wherein the distribution of signal contribution is a radial distribution of signal contribution.

14. The method of claim 11, wherein the temperature distribution is a three-dimensional or a two-dimensional distribution.

15. The method of claim 11, wherein the temperature distribution is a one-dimensional distribution.

16. The method of claim 11, wherein combining includes multiplying the temperature distribution by the distribution of signal contribution.

17. The method of claim 11, wherein combining includes calculating an integrated radial distribution of signal contribution.

18. The method of claim 11, wherein correcting includes multiplying the NMR data by a correction value derived from the temperature value to estimate a porosity value at one or more locations in the sensitive volume.

19. The method of claim 11, wherein correcting the NMR data includes calculating a centroid of an area or volume defined by the distribution of signal contribution, the temperature value corresponding to a value of the temperature distribution at a location in the sensitive volume corresponding to the centroid.

20. The method of claim 19, wherein correcting includes estimating a temperature corrected porosity $\varphi_{MT}$ based on the following equation:

$$\varphi_{MT} = \frac{\varphi_M \cdot T(r_c)}{T_M},,$$

wherein $\varphi_M$ is a porosity value estimated by calibrating the NMR data based on a measured temperature of borehole fluid, $T_M$ is the measured temperature, and $T(r_c)$ is a value of the temperature distribution at the radial location $r_c$ that corresponds to the centroid of the distribution of signal contribution.

* * * * *